Dec. 8, 1970    D. J. DE COURCY ET AL    3,546,474
METHOD OF AND APPARATUS FOR ELECTROHYDRAULIC
TRANSMISSION OF POWER
Filed Aug. 29, 1968    2 Sheets-Sheet 1
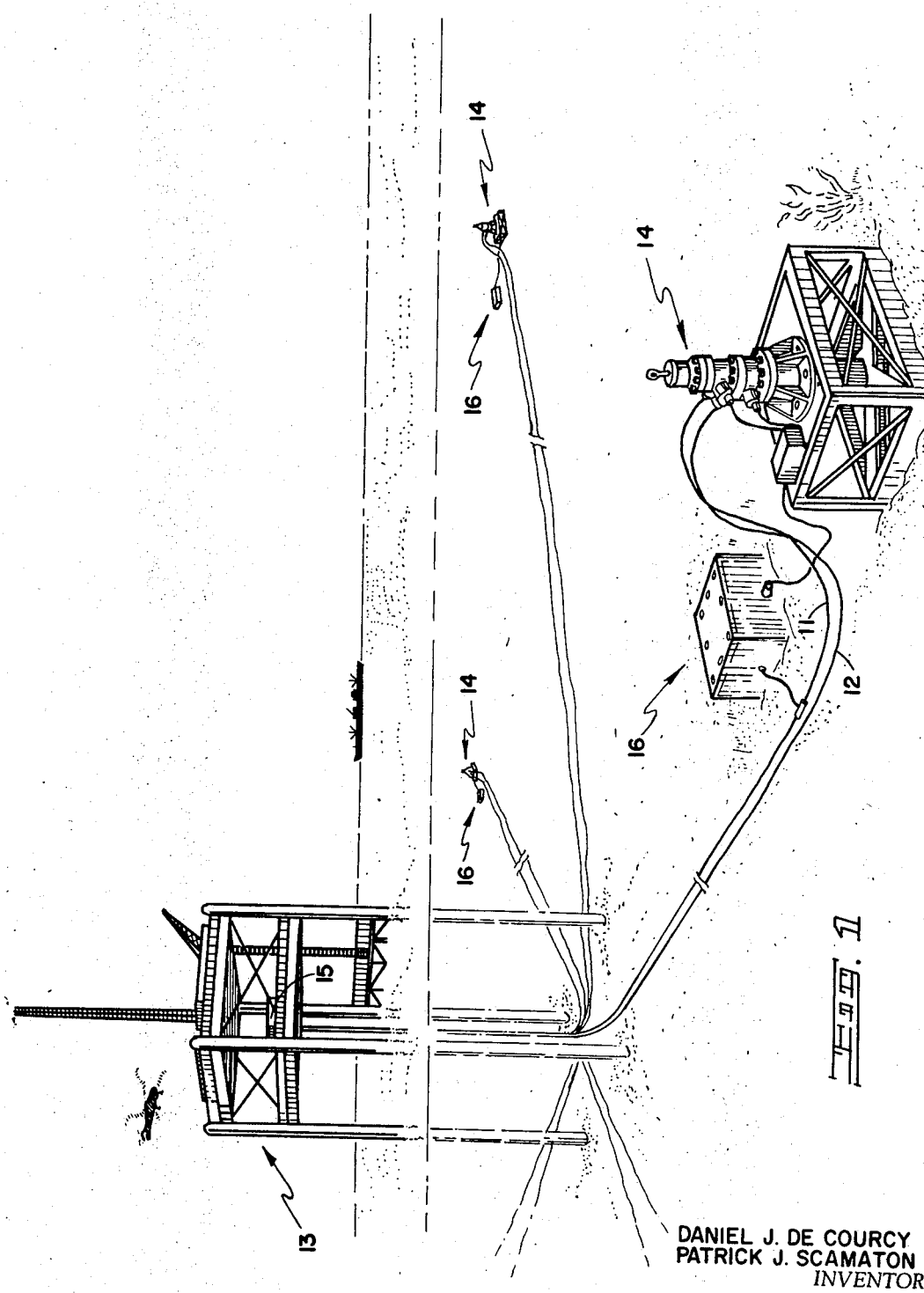
DANIEL J. DE COURCY
PATRICK J. SCAMATON
    INVENTOR.
BY Charles M. Hogan
Melvin E. Frederick
    ATTORNEYS

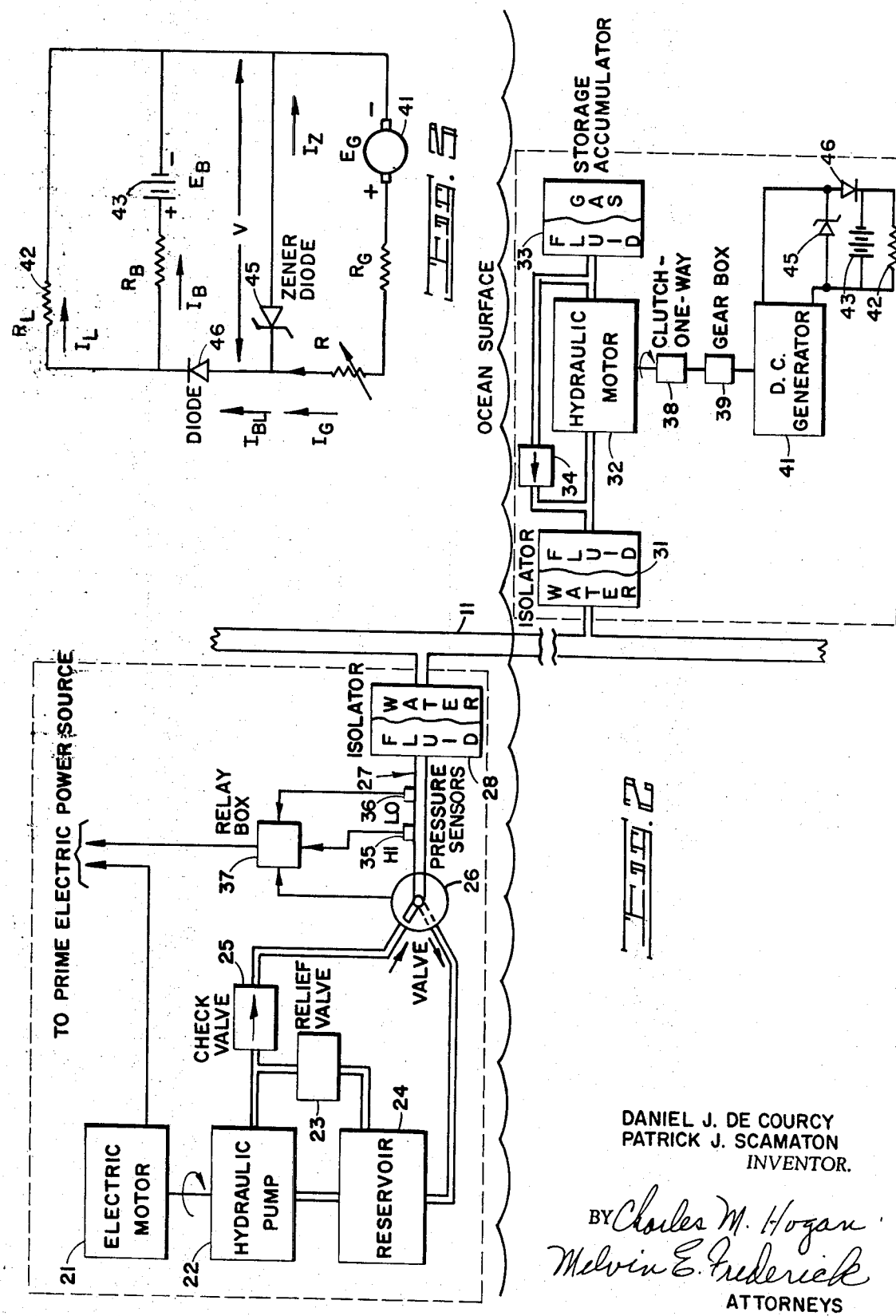

United States Patent Office 3,546,474
Patented Dec. 8, 1970

3,546,474
METHOD OF AND APPARATUS FOR ELECTRO-HYDRAULIC TRANSMISSION OF POWER
Daniel J. De Courcy, Chelmsford, and Patrick J. Scamaton, Lawrence, Mass., assignors to Avco Corporation, Cincinnati, Ohio, a corporation of Delaware
Filed Aug. 29, 1968, Ser. No. 756,200
Int. Cl. F01d 15/10
U.S. Cl. 290—52　　　　　　　　　　　　　　　　8 Claims

ABSTRACT OF THE DISCLOSURE

A method of an apparatus for electrohydraulic transmission of power to submerged locations such as oil wells and the like, which utilizes a control unit located above water and a second or remote unit located at each of one or more such locations or wellheads and coupled to the control unit by a suitable pipeline. The remote unit includes a battery pack, hydraulic motor-electric generator set, an isolating tank coupled to the pipeline, and a storage accumulator. The control unit includes a hydraulic pump, valve means, and an isolating tank coupled to the pipeline.

---

This invention relates to a method of and apparatus for transmission of power and more particularly to the movement of fluid under pressure from a hydraulic pump to drive a hydraulic motor-electric generator set to supply current to a battery and/or electrical load.

While it is to be understood that the present invention is not limited to subsea oil well applications and that it finds a wider application, for purposes of convenience and clarity, it will be described in such an environment.

Submerged oil wells are typically connected to the shore by two parallel pipes, one of which conducts the crude oil flow while the other is a clean line used for servicing the well. An assembly of switching and control valves, commonly called the "Christmas Tree," performs the necessary control functions and it is to meet the power demands of this assembly that the preferred embodiment of the present invention is designed.

Three modes of power supply can be considered.

(1) *On-Site Storage in Batteries.*—These have a limited storage life and must be inordinately large to supply adequate capacity.

(2) *On-Site Generation.*—Radio-isotopic thermo-electric generator systems now available are extremely costly and pose numerous handling problems. An alternate approach, coupling some of the well energy such as fluid kinetic or natural gas pressure interferes with crude line usage and such apparatus would be exposed to the hostile environment of the crude oil itself.

(3) *Transmission From Remote Source.*—This could be achieved by submarine cable at a high initial cost. In addition, biological attack corrosion and abrasion pose a constant threat of damage, introducing the problem of repair or replacement in deep water and/or long lengths.

The present invention contemplates remote transmission wherein existing pipelines are utilized. In addition to its long life, low cost, and minimum maintenance requirements, partcularly as compared to the alternatives, it is readily adaptable to substantially any wellhead/platform installation and for ocean depths to five thousand feet or more. Still further, it possesses considerable economic advantage over the alternate approaches when a number of submerged wellheads are serviced by a common command unit on the production platform.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIG. 1 is a pictorial representation of a submerged well system incorporating the present invention;

FIG. 2 is a block diagram of the apparatus in accordance with the preferred embodiment of the present invention; and FIG. 3 is a schematic diagram of a generating network.

FIG. 1 shows by way of example the general concept of a well system electrically serviced by a power transmission system in accordance with the invention. Line 11 is the normally unused service line parallel to the crude oil line 12 between the platform 13 and each Christmas Tree or wellhead 14. During the times when the transmission system is to be operated, hydraulic power is transmitted as more fully described hereinafter from a central or control unit 15 on the platform or collection tower 13 through the service line 11 to the remote unit 16 where the hydraulic power is converted to electric power and stored and/or used by the Christmas Tree as required, all as more fully described hereinafter.

Attention is now directed to FIG. 2 which shows in block diagram form the components of the control unit located on the platform and the remote unit located at the wellhead as illustrated in FIG. 1. The electrical supply requirements of undersea wellheads, more fully described hereinafter, typically demand short term but heavy power drains in conjunction with continuous low power drains. Accordingly, the electrical load portion of the remote unit includes rechargeable storage batteries more fully described hereinafter.

The components within the dashed line, which designates the control unit 15 on the platform, comprises an electric motor 21 driven by a conventional source of electrical power (not shown). The electric motor 21 drives a constant delivery-rate pump 22 and as long as the pressure seen by the pump is below the critical pressure of the relief valve 23, a suitable fluid such as hydraulic fluid is pumped from the reservoir 24 by the hydraulic pump 22 through the one-way valve 25, control valve 26, pipe 27, and into the isolating tank 28, thereby displacing the fluid such as, for example, sea water in the downstream side of the isolating tank 28. The volume of fluid so displaced in isolating tank 28 is transferred through the service line or pipe 11 to the isolating tank 31 in the remote unit 16. Isolating tank 31 is preferably filled on its downstream side by hydraulic fluid. During power transmission to the submerged unit 16, the extreme ends of the service line 11 must of course be closed by suitable valves (not shown).

The isolating tank 28 in the control unit must have sufficient initial capacity to supply the compression losses in the connecting service line (which as previously noted must be temporarily blocked at its extremities) in addition to the total capacity of the isolating tank 31 in the remote unit. The flow created by the constant delivery of pump 22 in the control unit is thus transmitted through the two isolating tanks and becomes for all practical purposes the constant efflux through the isolating tank 31 in the remote unit. The flow of hydraulic fluid from isolating tank 31 goes through the hydraulic motor 32 and flows into the storage accumulator 33. Check valve 34 is a one-way valve in the direction shown in FIG. 2, and only allows flow from the storage accumulator 33 if the pressure drop across valve 34 is in a sense as to aid such flow. During the pump cycle, check valve 34 has a reverse pressure differential across it, and hence, all flow is directed through motor 32. As the fluid from isolating tank 31 fills the storage accumulator 33, the pressure in the storage accumulator increases as the air therein is compressed.

The energy absorbed by the hydraulic motor 32 and the storage accumulator 33 is derived from the pressure and the flow rate, which determines the work the hydraulic pump 22 must supply. At a suitable prescribed pressure, the pumping phase is terminated. The high pressure and low pressure sensors 35 and 36 via relay 37 control actuation of the valve 26 to connect line 27 with either the hydraulic pump 22 or the reservoir 24.

Operation of the high pressure sensor 35 connects line 27 to the reservoir 24 allowing the stored gas pressure in accumulator 33 to return the hydraulic fluid via check valve 34 to the isolator 31 thus expelling the water back into line 11.

The water thus displaced in line 11 enters the isolator 28 and returns the hydraulic fluid therein via valve 26 to the reservoir 24.

Meanwhile, the blocked flow from the pump 22 is returned via relief valve 23 to the reservoir 24 avoiding excessive pressure and/or damage to the system.

When the pressure in line 27 falls to the prescribed setting of the sensor 36, the relay 37 switches valve 26 to the other position thus initiating a new cycle. The pump 22 thus preferably runs continuously eliminating unnecessary starting and stopping of the electric motor 21.

During the period that flow from the hydraulic pump 22 is being transmitted to the remote unit 16, the shaft of the hydraulic motor 33 in the remote unit is preferably rotated at constant r.p.m. Neglecting losses, the pressure drop across the hydraulic motor is determined by the input torque requirements of the generator 41 connected to the motor 32 via clutch 38 and gear box 39. That torque is, in turn, determined by the electromagnetic drag of the generator 41, which is in turn determined by the current taken out of the generator by its attached electrical load 42 and/or battery pack 43. The watts of electric power demanded of the generator 41 by the electrical energy absorbing load 42 are directly convertible to the horsepower required by the hydraulic motor 32. The hydraulic motor 32 in the remote unit 16 places its demand on the hydraulic pump 22 in the control unit 15 which draws on its electric motor 21 connected to the source of electric power (not shown) on the platform.

The power output of the hydraulic pump 22 is absorbed in two ways, ignoring line losses. The power absorbed by the hydraulic motor 32 is converted into electrical energy by the generator 41, however, power is also absorbed in compressing the air in the accumulator 33 and this power increases exponentially as the pumping phase progresses and represents a wastage of power.

In practice termination of this phase is most readily accomplished by complete expulsion of fluid from the isolator 31 and the resultant rapid pressure rise in lines 11 and 27 may be used to trigger the high pressure sensor 35.

The electric power requirements at a wellhead and the time available for operating the system form the basic system input for the embodiment described herein. Additionally, any constraints on prime power are significant design inputs, but for purposes of this discussion, it is assumed that any required prime power conditions can be met. Further, the load characteristics and the re-energizing time place minimum limits on the battery pack capacity and on the generator output while the choice and demands of the generator determine the size of the hydraulic motor. The selection of the storage accumulator is relatively independent, but should be based on reliability, availability, and cost. However, it should be noted that the choice of a storage accumulator directly affects the size of the isolating tanks, the length of the generating cycle and the level of unusable energy transfer (and, hence, efficiency) of the system. These considerations, in addition to the hydraulic motor specifications, lead to the determination of the pump and its driving electric motor.

The system must be designed to accommodate the wellhead electrical power requirements, the time limitations, if any, on the transmitting system operation, the physical location specifications of the total network and finally lifetime required. The load power requirements are characterized by a power profile with time, the allowable voltage variations, limits on any ripple components both generated by the load and absorbable by the load from the generator, failure mode conditions both in the load and the power converter, and required power reserve. The expected average pipeline availability must be known to identify any limit on the re-energizing duty cycle. The geometry of the installation, including pipeline length, depth of wellhead, diameter and expected contents of the service line during operation, maximum pipe pressure possible, local ocean environment, and the description and limitations of the prime power source must be established. Finally, the time desired between servicing and overall system lifetime must be defined.

A typical wellhead power demand comes from three sources:

(1) Sonar (communications) standby—0.3 watt continuous
(2) Sonar in-use—600 watts for 10 secs., twice per day
(3) Christmas Tree operation—4000 watts for 1 minute every two days
(4) Standby reserve—4000 watts for 3 minutes.

A generating capacity of 45 watts will meet this requirement with a 4 percent duty cycle or one hour per day.

The provision of the battery pack in the remote unit allows continuous load servicing with only periodic re-energizing, and accommodates short termed very high power drains without excessive demands on or over-designing the transmission system. Of the various batteries available, such as silver zinc, silver cadmium, lead oxide and nickel cadmium cells, the nonvented nickel carmium cells are deemed best suited for this purpose.

With conventionally available data, the battery pack can be sized to meet the electrical load specifications, but it should be noted that the charge rate used determines the level of oxygen pressure established within a sealed cell. Accordingly, high charging rates should be avoided to assure long life.

FIG. 3 shows in schematic form the generating network in the remote unit. The generator 41 is shown as a DC unit (an AC system with appropriate rectification and filtering is deemed equivalent) characterized as an ideal EMF generator having output no-load voltage $E_G$ in series with an equivalent resistance $R_G$. A series resistance R may be provided if current limiting is needed to accommodate the capacity of the Zener diode 45 connected across resistor R and the generator. The battery pack 43 is characterized as having an ideal series cell potential $E_B$ in series with its associated resistance $R_B$. The load 42 is characterized by an impedance $R_L$.

The Zener diode 45 is included in the circuit to limit the maximum potential which the battery can reach.

Under the condition that the battery potential is at the voltage rating of the Zener diode (i.e., the battery requires no additional charging) the battery and load are effectively disconnected from the generating network. The Zener diode will draw enough current from the generator such that the difference between the generator EMF and the Zener diode voltage rating is dropped across the series connected resistances R and $R_G$. The generator EMF is essentially only a function of the r.p.m. of the hydraulic motor. Thus, if the generator EMF is greater than the Zener rating, current will flow through the Zener diode and dissipate power therein. If the power loss in the Zener diode is too high (or such a waste is deemed undesirable) the current and power can be reduced by increasing resistance R until an acceptable level is reached. However, a trade-off exists here since an increase in resistor R will later appear as a loss mechanism during the normal battery charging process.

Consider now the situation where the battery has been somewhat depleted and its terminal potential has dropped below its existing design level. If the Zener diode is operational, its rated voltage (which is now greater than the cell voltage) will appear across the battery and therefore the difference must be dropped across the resistance $R_B$. If the load is connected across the battery at this time, the generator must supply the load current shown as $I_L$ in FIG. 3, in addition to the currents $I_B$ and $I_Z$. If this current is large enough, the Zener diode potential will fall below its rating and drop out of the circuit and the current $I_G$ out of the generator will supply the combined demand of the battery and the load. If more than a predetermined amount of current is required from the generator, the effective generator terminal voltage will fall below the battery voltage and the battery will therefore try to supply current to the generator as well as to the load. In this case, the isolating diode 46 will disconnect the generator from the battery pack. However, as soon as the battery attempts to supply the load alone, its terminal voltage will fall and eventually the generator will come back into the circuit. The aforementioned automatic adjustment of the generator and battery operates as required to meet any existing conditions. It should be noted, however, that if the resistor R has been set too high, the generator under these last conditions will cut out at a low current value.

Consider now the worst possible case when the battery voltage is at its minimum. This is the case of maximum current drain for the battery pack and generator and will require maximum power to be supplied to the generator from its hydraulic motor. The necessary voltage cannot be maintained across the Zener diode and it will become inoperative. The difference in voltage between the generator EMF and the battery potential will be dropped across the series resistors $R_G$, R, and $R_B$, and the resulting current is fed into the battery.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:

1. In a power transmission system for supplying electrical power to a load, the combination comprising:
   (a) hydraulic pumping means for pumping a fluid;
   (b) hydraulic motor means;
   (c) fluid storage accumulator means for receiving fluid from said motor means;
   (d) fluid circuitry containing fluid operatively connecting said hydraulic motor and pumping means, said circuitry including first and second isolating tank means for isolating the fluid in said fluid circuitry from fluid pumped by said pump and from fluid pumped into and exhausted from said fluid storage accumulator means, said isolating tank means having a fluid capacity at least as great as that of said fluid storage accumulator means, said hydraulic pumping means including a fluid reservoir and a hydraulic pump coupled to said reservoir for receiving fluid from said reservoir and supply fluid to said fluid circuitry; and relief valve means coupled between said pump and said fluid circuitry for directing fluid pumped by said pump back to said reservoir when the pressure in said fluid circuitry exceeds a predetermined amount;
   (e) valve means connected between said accumulator and said motor whereby fluid received by said accumulator means is returned therethrough to said fluid circuitry;
   (f) electrical generating means having output terminals, said generating means being in driven connection with said motor means;
   (g) electrical storage means having first and second terminals connected across the output terminals of said generating means and said load; and
   (h) means for controlling said pumping means for providing a pumping cycle wherein fluid is caused to flow via said fluid circuitry through said motor means into said accumulator means and an exhaust cycle wherein said fluid pumped into said accumulator means is returned via said valve means.

2. The combination as defined in claim 1 wherein said means for controlling said pumping means includes valve control means coupled between said hydraulic pump, said reservoir and said first isolating tank means for directing fluid from said pump to said first isolating tank means until the pressure in said first isolating tank means reaches said predetermined amount and directing fluid from said first isolating tank means to said reservoir after said pressure in said isolating tank means exceeds said predetermined amount and until the pressure in said isolating tank means decreased to a second predetermined amount.

3. The combination as defined in claim 2 wherein said valve control means comprises a two-position spool valve alternately actuated by a high pressure sensor and a low pressure sensor for measuring the fluid pressure at about the inlet of said first isolating tank means.

4. The combination as defined in claim 3 and additionally including circuit means coupling said electrical generating means to said electrical storage means for preventing overcharging of said storage means.

5. In a system for generating and storing electrical power in a sealed remote unit adjacent a submerged wellhead on the sea bottom controlled from an above surface platform, the combination comprising:
   (a) hydraulic pumping means on said platform for pumping a fluid;
   (b) hydraulic motor means in said remote unit;
   (c) fluid storage accumulator means in said remote unit for receiving fluid from said motor means;
   (d) fluid circuitry containing fluid operatively connecting said hydraulic motor and pumping means, said circuitry including first and second isolating tank means for isolating the fluid in said fluid circuitry from fluid pumped by said pump and from fluid pumped into and exhausted from said fluid storage accumulator means, said isolating tank means having a fluid capacity at least as great as that of said fluid storage accumulator means, said hydraulic pumping means including a fluid reservoir and a hydraulic pump coupled to said reservoir for receiving fluid from said reservoir and supply fluid to said fluid circuitry; and relief valve means coupled between said pump and said fluid circuitry for directing fluid pumped by said pump back to said reservoir when the pressure in said fluid circuitry exceeds a predetermined amount;
   (e) valve means in said remote unit connected between said accumulator and said motor whereby fluid received by said accumulator means is returned therethrough to said fluid circuitry;
   (f) electrical generating means in said remote unit having output terminals, said generating means being in driven connection with said motor means;
   (g) electrical storage means in said remote unit connected across the output terminals of said generating means and a load in said wellhead; and
   (h) means for controlling said pumping means for providing (1) a pumping cycle wherein fluid is caused to flow from said pumping means via said fluid circuitry, through said motor means and into said accumulator means, and (2) an exhaust cycle wherein said fluid pumped into said accumulator means is returned via said valve means.

6. The combination as defined in claim 5 wherein said means for controlling said pumping means includes valve control means coupled between said hydraulic pump, said reservoir and said first isolating tank means for directing fluid from said pump to said first isolating tank means until the pressure in said first isolating tank means reaches said predetermined amount and directing fluid from said first isolating tank means to said reservoir after said pressure in said isolating tank means exceeds said predetermined amount and until the pressure in said isolating tank means decreased to a second predetermined amount.

7. The combination as defined in claim 6 wherein said valve control means comprises a two-position spool valve alternately actuated by a high pressure sensor and a low pressure sensor for measuring the fluid pressure at about the inlet of said first isolating tank means.

8. The combination as defined in claim 7 and additionally including circuit means coupling said electrical generating means to said electrical storage means for preventing overcharging of said storage means.

References Cited
UNITED STATES PATENTS

| | | | |
|---|---|---|---|
| 2,199,319 | 4/1940 | Lansing | 290—52 |
| 3,163,224 | 12/1964 | Haeber et al. | 166—6 |
| 3,283,165 | 11/1966 | Bloch | 290—30X |
| 3,292,695 | 12/1966 | Haeber | 166—.5 |
| 3,345,517 | 10/1967 | Smith | 290—30X |
| 3,366,173 | 1/1968 | McIntosh | 166—.5 |
| 3,368,082 | 2/1968 | Oberlander | 290—30 |

GLEN R. SIMMONS, Primary Examiner

U.S. Cl. X.R.

290—1; 166—.5